Dec. 23, 1969  R. S. NAKASHIMA  3,484,978
FISHING SIGNAL APPARATUS
Filed March 25, 1968
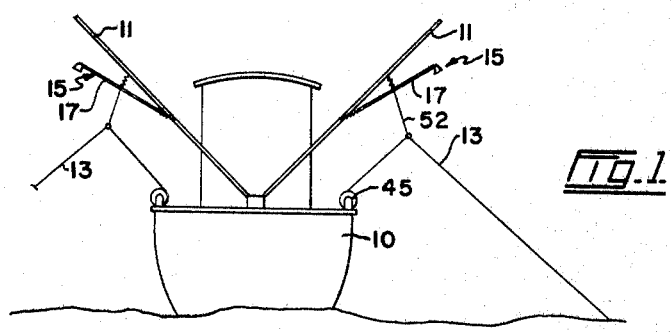
Fig.1
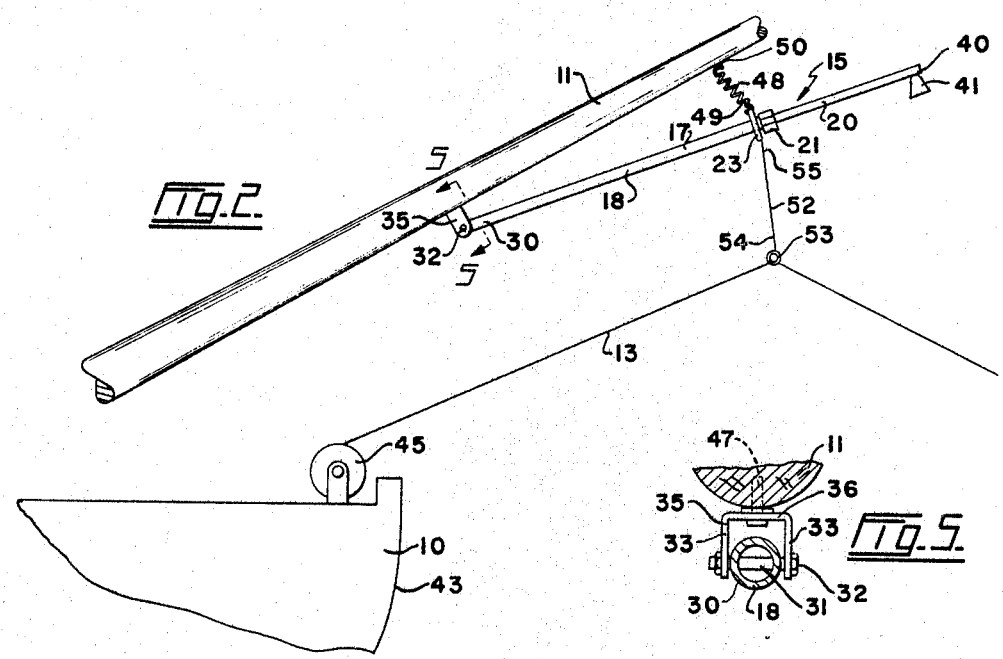
Fig.2
Fig.5
Fig.3
Fig.6
Fig.4
INVENTOR
ROBERT S. NAKASHIMA
BY
Fetherstonhaugh & Co.
ATTORNEYS

United States Patent Office 3,484,978
Patented Dec. 23, 1969

3,484,978
FISHING SIGNAL APPARATUS
Robert S. Nakashima, 7484 Rosewood St., South Burnaby,
British Columbia, Canada
Filed Mar. 25, 1968, Ser. No. 715,775
Int. Cl. A01k 97/10, 97/12, 91/00
U.S. Cl. 43—17                                5 Claims

ABSTRACT OF THE DISCLOSURE

Fishing signal apparatus for a boat-towed trolling line comprising an elongated rod having a bell at one end and being swingably mounted at its other end on a boom. Means depends from the rod for obtaining a running connection with the trolling line and a spring connecting the boom and rod maintains the latter in a laterally extending position against the pull of the trolling line, whereby the strike of a fish against a lure towed by the trolling line will cause the rod to vibrate and the bell to ring.

BACKGROUND OF THE INVENTION

This invention relates to apparatus for signalling the strike of a fish and is more particularly related to signalling apparatus for use with boat-towed trolling lines.

In troll fishing, particularly of the commercial type, it is essential for efficiency of operation, that several lines be trailed at one time. In order to avoid loss of fish, the fisherman must be apprised immediately of the strike of a fish so that he can immediately reel in the particular trolling line upon which the fish is hooked. Where, therefore, several lines are trolled at once the job of giving all of them close attention becomes most monotonous.

It has therefore become the practice to attach to each trolling line a fishing signal which gives audible evidence of the strike of the fish against the bait or lure trolled thereon.

Fishing signals of prior design have usually employed a resilient rod to which the line is secured and a bell affixed to the rod which will ring upon movement of the latter. The rod forming part of such fishing signal apparatus must therefore be of relatively heavy construction in order to withstand the weight of the largest fish and furthermore, where this type of signal apparatus is carried on a boat the constant movement thereof and the tremors imparted to the line by the lures carried thereon keeps the rod in constant motion with the resultant continuous and irritating ringing of the bell.

SUMMARY OF THE INVENTION

The present invention provides a fishing signal which, although utilizing a rod moved by the trolling line to ring a bell thereon, is so designed that the rod is not required to support the weight of a fish at the end of the trolling line and may therefore be of relatively light construction. Furthermore, the fishing signal of the present invention is so adjustable as to only have the bell ring when a fish strikes the lure on the line with which it is associated thereby eliminating the irritating aspect of a constantly ringing bell.

The fishing signal of the present invention comprises an elongated rigid rod having means at one end whereby it may be anchored for swivelling movement to a boom extending outwardly from a boat, line engaging means on the rod spaced from the anchored end thereof through which the trolling line slidably extends, resilient tethering means connecting the rod to the boom for yieldably maintaining the rod in a laterally extending position against the pull of the trolling line and a bell having a clapper connected to the free end of the rod for angular adjustment about the longitudinal axis of the latter.

BRIEF DESCRIPTION OF THE DRAWINGS

FIGURE 1 is an end view of a fishing boat with the invention, shown thereon,

FIGURE 2 is an enlarged isometric view of the invention attached to a fishing boat, FIGURE 3 is an enlarged central sectional view of a portion of the invention, FIGURE 4 is a sectional view along line 4—4 of FIGURE 3, FIGURE 5 is an enlarged view taken along line 5—5 of FIGURE 2, and FIGURE 6 is an enlarged side view of the free end of the rod and the bell.

DESCRIPTION OF THE PREFERRED EMBODIMENT

Referring to FIGURE 1 there is illustrated a fishing boat 10, of the commercial type. This boat, like other boats of its type, is equipped with a number of booms 11 which may be swung outwardly laterally of the longitudinal axis of the boat and to which a number of trolling lines 13 may be secured to trail from the boat as the latter moves through the water.

Each of the trolling lines 13 is connected to its associated boom by fishing signal apparatus of the present invention, herein accorded the numeral 15, which signals the strike of a fish on any one of the lines.

As illustrated in FIGURES 2 and 3, the fishing signal apparatus 15 comprises an elongated rod 17 having a main, cylindrical, tubular section 18 into one end 19 of which an elongated telescopic section 20 of cylindrical cross section rotatably and slidably fits. The end 19 of the main section 18 of the rod, reference FIGURE 3, is tapered, split and exteriorly threaded to threadedly receive a nut 21.

Over the main section 18 of the rod adjacent said end 19 is fitted an elongated closed link 23 which is welded as at 24 to said rod to form a pair of diametrically opposed connecting loops 25 and 26.

The other end 30 of the main section 18 of the rod (reference FIGURE 5) is pivotally mounted on the shaft 31 of a bolt 32 which passes transversely through a pair of arms 33 of a U-shaped clevis 35, the latter having an apertured base 36 from which the arms 33 extend.

Mounted adjacent the free end 40 of the telescopic section 20 of the rod is a bell 41 having a central elongated clapper 42. This bell, see FIGURE 6, is of the cup shaped type and is nonrotatably secured, as by welding, to the telescopic section 20 so that the clapper extends laterally therefrom.

The use of the fishing signal apparatus and its application to a boat can best be described with reference to FIGURE 2, wherein a side 43 of the boat 10 is illustrated with one of the booms 11 projecting therefrom. There is also illustrated a reel 45 upon which the trolling line 13 is wound. The reel may be powered hydraulically, or electrically, or may have a direct mechanical connection to the engine of the boat.

The fishing signal apparatus is connected to the boom 11 by means of the clevis 35, a bolt 47 being extended through the apertured base 36 and into the boom 11 sufficiently to permit the clevis to swing freely thereon. The rod 17 is extended outwardly adjacent the boom and a coil spring 48 is connected at one end 49 to the connecting loop 25 and at its other end is looped about a staple 50 which may be driven into the boom.

A stub line 52 having a ring 53 connected to one of its ends 54 is connected at its other end 55 to connecting loop 26 of the link 23. The trolling line 13 is extended outwardly and laterally from the reel and slidably passes through the ring 53.

The pull of the trolling line against the stub line 52 acting through the link 23 will tend to swing the rod 17 away from the boom until the tension in the coil spring 48, also acting through the link, just balances the pull on the trolling line.

If the waters through which the boat passes are very smooth and if the bait or lure trolled by the trolling line does not vibrate excessively, the rod 17 will remain fairly quiet and thus the bell will not sound until a fish strikes the bait or lure whereupon the struggles of the fish will be communicated to the rod 17 through the stub line causing the rod to vibrate and the bell to ring.

It will be appreciated, however, that waters in which commercial fishing is undertaken are seldom smooth and the boat, consequently, will rock from side-to-side. This continuous motion of the boat would, in normal circumstances, result in a continuous ringing of a bell secured thereto which can become very annoying. The adjustable aspect of the apparatus 15 permits the bell to be positioned so that it will only ring upon violent movement of the rod. The angular position of the bell may be adjusted by simply loosening the nut 21, rotating the telescopic section 20 of the rod so as to rotatably position the bell and then retightening the nut to maintain the bell in a position in which normal rocking movements of the boat will not result in its ringing.

It will be also seen that the pull of the trolling line is directed, through the mediacy of the stub line and link 23, directly to the spring 48. As the rod is free to swivel on the clevis 35 it is not subject to bending or the like and may therefore be of very light construction sufficient only to support the weight of the bell.

I claim:

1. Fishing signalling apparatus for use with a boat-towed trolling line comprising an elongated rod formed of a pair of telescoping rotatably adjustable sections, means for swivelly anchoring one end of one of the sections to a boom extending outwardly from the boat, line engaging means connected to the anchored section and spaced from the anchored end thereof for slidably engaging the trolling line, resilient tethering means connected between the boom and the anchored section of the rod for yieldably maintaining the rod in a laterally extending position against the pull of the trolling line and a bell connected to the other of said rod sections for giving audible evidence of movement of the rod.

2. Fishing signalling apparatus as claimed in claim 1 in which the bell has a clapper and is secured to the rod in a position in which the clapper extends laterally outwardly therefrom.

3. Fishing signalling apparatus as claimed in claim 1 in which the resilient tethering means comprises a coil spring, said spring being connected at one end to the boom and at its other end to the anchored section of the rod at its end opposite its anchored end.

4. Fishing signalling means as claimed in claim 1 in which the line engaging means comprises a connecting loop on the anchored section of the rod at its end opposite its anchored end, and a stub line connected at one end to the loop and having a ring connected at its other end through which the trolling line slidably passes.

5. Fishing signalling apparatus as claimed in claim 1 in which the means for anchoring said anchored section comprises a U-shaped clevis having a pair of arms and a base, a pivot pin extending between the arms upon which the anchored end of the anchored section is pivotally connected and a bolt passed through the base for rotatably connecting the latter to the boat.

References Cited

UNITED STATES PATENTS

| | | | |
|---|---|---|---|
| 467,123 | 1/1892 | Kunzel | 43—17 |
| 935,877 | 10/1909 | Woesley et al. | 43—17 |
| 952,812 | 3/1910 | Jorgensen | 43—21.2 |
| 2,238,127 | 4/1941 | Nissen | 43—21.2 |
| 2,360,402 | 10/1944 | Determan | 43—21.2 |
| 2,473,778 | 6/1949 | Benes | 43—21.2 |
| 2,749,648 | 6/1956 | Schneider | 43—17 |
| 2,925,682 | 2/1960 | Kravitch | 43—17 X |

SAMUEL KOREN, Primary Examiner

D. J. LEACH, Assistant Examiner

U.S. Cl. X.R.

43—27.4, 42.72